United States Patent
Jolfaei (10) Patent No.: US 8,706,887 B2
(45) Date of Patent: Apr. 22, 2014

(54) MULTI-CHANNEL SESSIONS

(75) Inventor: Masoud Aghadavoodi Jolfaei, Wiesloch (DE)

(73) Assignee: SAP AG, Walldorf (DE)

( * ) Notice: Subject to any disclaimer, the term of this patent is extended or adjusted under 35 U.S.C. 154(b) by 811 days.

(21) Appl. No.: 12/493,627

(22) Filed: Jun. 29, 2009

(65) Prior Publication Data

US 2010/0332665 A1 Dec. 30, 2010

(51) Int. Cl.
*G06F 15/16* (2006.01)

(52) U.S. Cl.
USPC .............................. 709/228; 709/227; 726/3

(58) Field of Classification Search
USPC ....................................... 709/228, 227; 726/3
See application file for complete search history.

(56) References Cited

U.S. PATENT DOCUMENTS

| | | | |
|---|---|---|---|
| 6,851,113 B2* | 2/2005 | Hemsath | 718/104 |
| 6,986,040 B1* | 1/2006 | Kramer et al. | 713/155 |
| 7,092,370 B2* | 8/2006 | Jiang et al. | 370/329 |
| 7,433,956 B2* | 10/2008 | Zhao et al. | 709/228 |
| 7,443,872 B1* | 10/2008 | Corbett et al. | 370/431 |
| 7,818,432 B2* | 10/2010 | Da Palma et al. | 709/227 |
| 7,870,267 B2* | 1/2011 | Gilfix et al. | 709/227 |
| 8,006,300 B2* | 8/2011 | Mizrah | 726/20 |
| 2007/0133769 A1* | 6/2007 | Da Palma et al. | 379/142.1 |
| 2009/0235329 A1* | 9/2009 | Chavez et al. | 726/3 |
| 2010/0318667 A1* | 12/2010 | Miller et al. | 709/228 |

* cited by examiner

*Primary Examiner* — Duyen Doan
(74) *Attorney, Agent, or Firm* — Fish & Richardson P.C.

(57) ABSTRACT

Implementations of the present disclosure provide multiple communication channels between a client and a session and include establishing a first communication channel between the session and a first application program executed on the client, the session being active on an application server, the first application program using a first communication protocol, and instantiating a second application program on the client. A second communication channel is established between the second application program and the session, the second application program using a second communication protocol different from the first.

11 Claims, 6 Drawing Sheets

MULTI-CHANNEL SESSIONS

BACKGROUND

A user can invoke one of a multitude of available applications to perform particular activities. The user can initiate a session, where they select and run an application in a web browser, for example. The application can communicate with an application server using a protocol (e.g., Hypertext Transfer Protocol (HTTP)) to perform various user-selected activities.

While running the application, a user may require data or information for use in the application that cannot be input to the system using the currently running application. The user may exit the application, interrupting their current activity, in order to retrieve the desired data or information from its database to potential use in another session of the browser-based application.

SUMMARY

Implementations of present disclosure include a method of providing multiple communication channels between a client and a session. In some implementations, the method includes establishing a first communication channel between the session and a first application program executed on the client, the session being active on an application server, the first application program using a first communication protocol, instantiating a second application program on the client, and establishing a second communication channel between the second application program and the session, the second application program using a second communication protocol different from the first.

In some implementations, the method further includes executing a request and response phase using the first communication channel that initiates establishment of the second communication channel.

In some implementations, the method further includes issuing a response from the session to the client, the response including a plurality of connection parameters, the instantiating occurring based on the response.

In some implementations, the method further includes generating a request from the first application program subsequent to the instantiating, and generating an output via the second application program based on the request.

In some implementations, the method further includes authorizing a user for communication through the second communication channel based on a security protocol.

In some implementations, the method further includes authorizing a client for communication with the session through the second communication channel based on at least one of a certificate and a session ticket provided to the session from the client.

In some implementations, each of the first and second communication protocol includes one of hypertext transfer protocol (HTTP), SAPGUI protocol, remote function call (RFC) protocol, simple mail transfer protocol (SMTP) and file transfer protocol (FTP).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
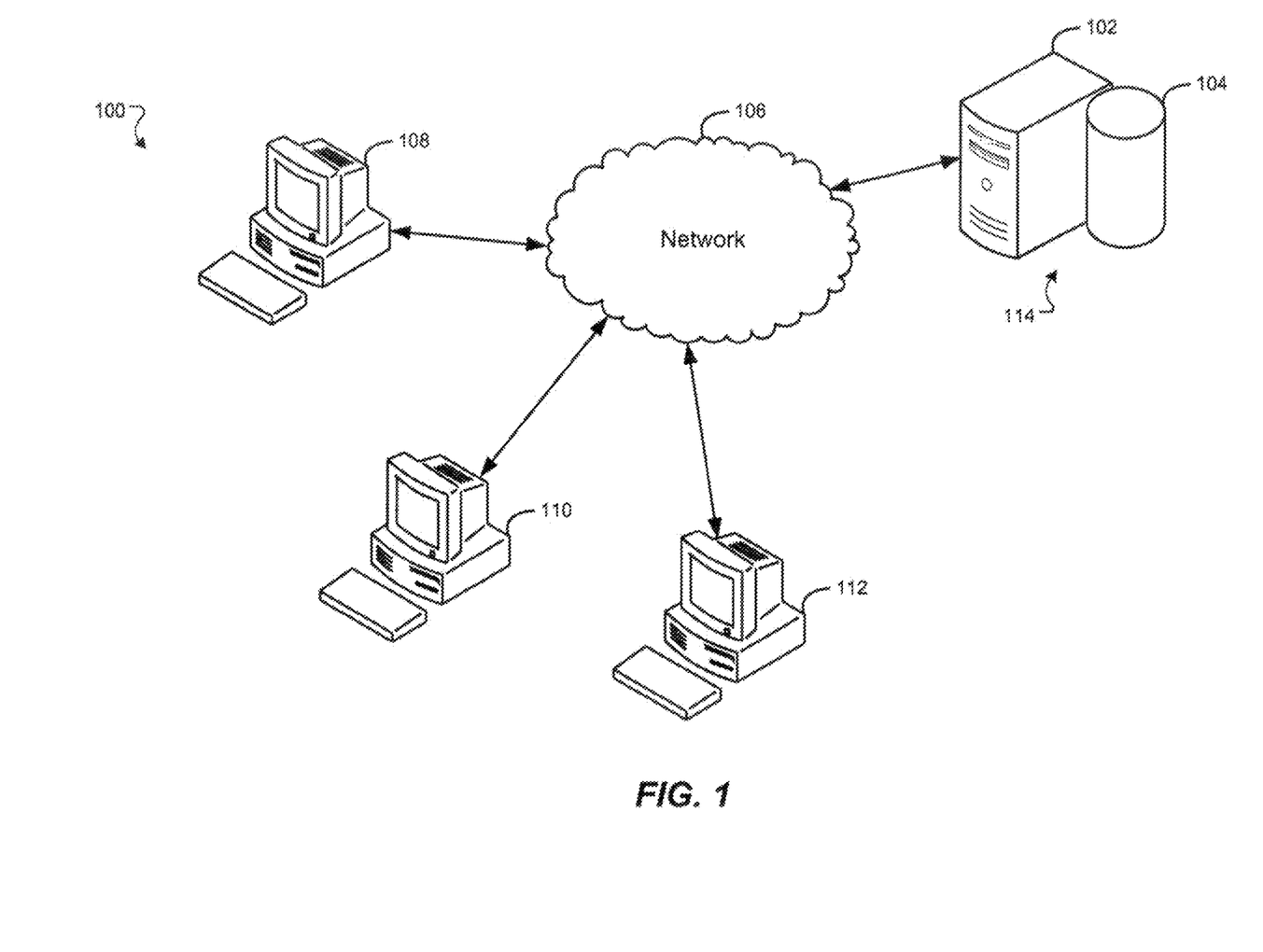
FIG. 1 is a block diagram of an exemplar system architecture that can execute implementations of the present disclosure.

FIG. 1 is a block diagram of an exemplar system 100 architecture that can execute implementations of the present disclosure. The system 100 can include a computer system 114 that can be provided as an application server 102 including a database 104. The system 100 can include a plurality of clients 108, 110, 112. The computer system 114 and the clients 108, 110, 112 can be can be connectively coupled to a network 106.

In some implementations, the system 100 can be a distributed client/server system that spans one or more networks such as network 106. In some implementations, each client (e.g., clients 108, 110, 112) can communicate with the application server 102 via a virtual private network (VPN), Secure Shell (SSH) tunnel, or other secure network connection. In some implementations, the network 106 can include the Internet, a wireless service network and may also include the Public Switched Telephone Network (PSTN). In other implementations, the network 106 may include a corporate network (e.g., an intranet) and one or more wireless access points.

Each client (e.g., clients 108, 110, 112) can establish its own session with the application server 102. Each session can be semi-permanent as it can be established at one point in time and torn down at another. Each session can involve two-way information exchange between the computer system 114 and each individual client 108, 110, 112. For example, a Hypertext Transfer Protocol (HTTP) session can allow the association of information with individual users.

A session can be stateful where at least one of the communicating parts (e.g., the application server 102 or the client (e.g., clients 108, 110, 112)) can save information about the session history in order to be able to communicate. Alternatively, stateless communication includes independent requests with associated responses.

Multiple clients (e.g., clients 108, 110, 112) can communicate via network 106 with the application server 102. In order to run an application, such as a browser-based application, for example, each client (e.g., clients 108, 110, 112) can establish a corresponding session with the application server 102. A user can invoke applications available from the application server 102 in a web browser running on client 108. Users of clients 110 and 112 can also invoke applications on each of their respective clients. For example, each application on each client can establish a unique HTTP session with the application server 102. Each application can individually access data from the database 104.

Figure 2:
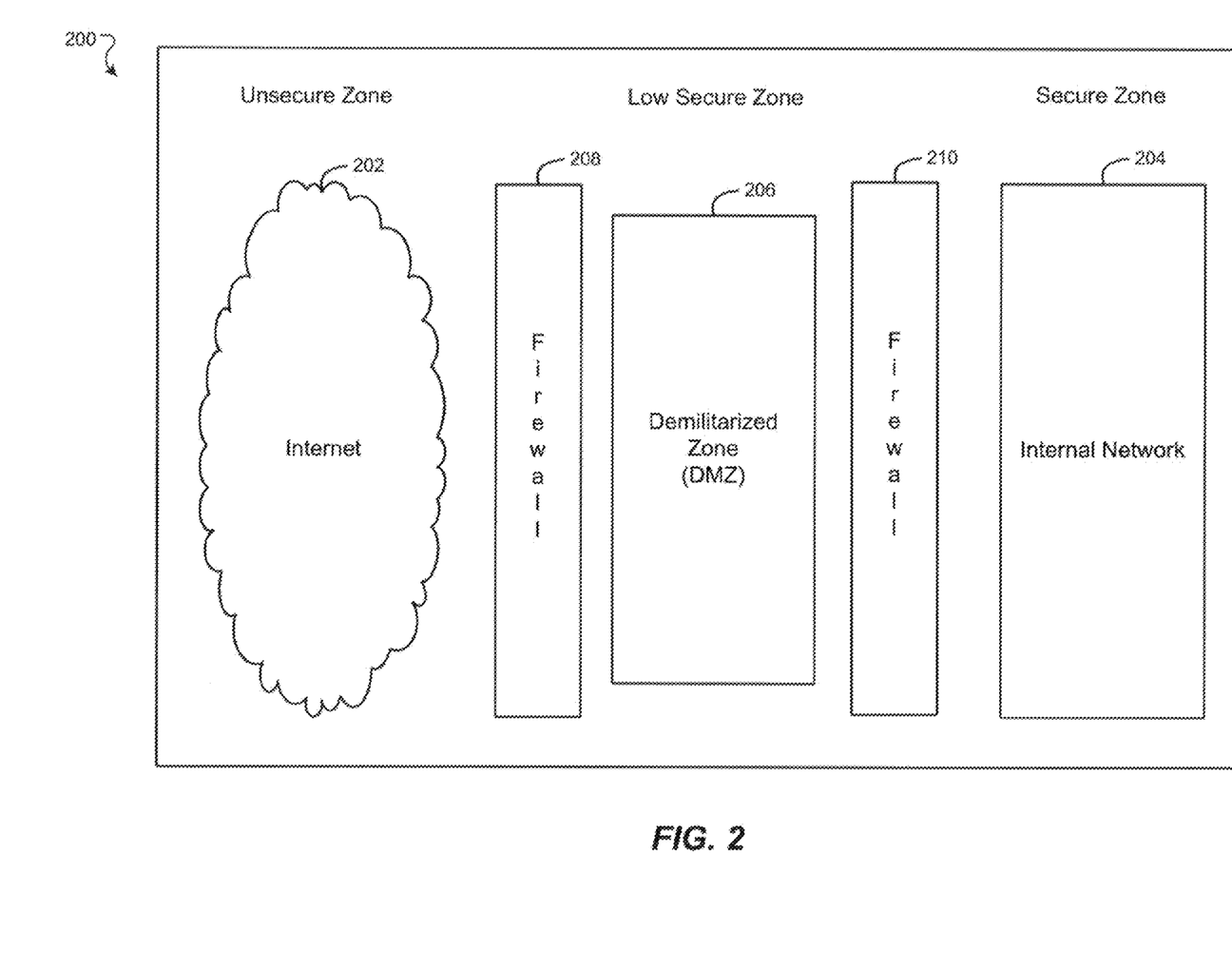
FIG. 2 is a block diagram of an exemplar architecture for communication between a secured zone and an unsecured zone.

FIG. 2 is a block diagram of an exemplar architecture 200 for communication between a secured zone and an unsecured zone. The network connection established between each client (e.g., clients 108, 110, 112) and the application server 102 can be achieved using various protocols in order to establish a secure network connection between the client and the server.

In the example of FIG. 2, and referring to FIG. 1, the network 106 can be Internet 202, demilitarized zone (DMZ) 206, discussed in further detail below, or an internal secure network 204. The computer 114 can be connected to the internal secure network 204 or DMZ 206. A client connected to the Internet 202 (e.g., client 108 connected to network 106) wishes to establish a session on the application server 102. The Internet 202 is located in an unsecure, public zone. Architecture 200 can be used to provide a secure network connection between a client in an unsecure zone and a server in a secure zone.

A demilitarized zone (DMZ) 206 can be located between firewalls 208 and 210. The DMZ 206 can be a physical or logical sub-network that exposes the internal network 204 in a secure zone to the internet 202 in an unsecure zone. The DMZ 206 can be located in a low security zone. The DMZ 206 can protect the internal network 204 from the Internet 202 by exposing only the external services of the internal network 204 to the Internet 202. For example, computer 114 can be connected to the internal network 204 or DMZ 206. In some implementations, the computer 114 can be connected to the internal network 204 therefore the application server 102 can reside on the internal network 204. In this implementation, the DMZ 206 can make designated applications on the application server 102 available externally, while blocking any external access to the database 104, protecting any sensitive internal data.

The firewalls 208, 210 can block unauthorized access while permitting authorized communications. Firewall 208 can block unauthorized access to the internal network 204 and the DMZ 206. Firewall 210 can block unauthorized access outside of the internal network 204. The firewalls 208, 210 can add a level of security around the DMZ 206.

Figure 3:
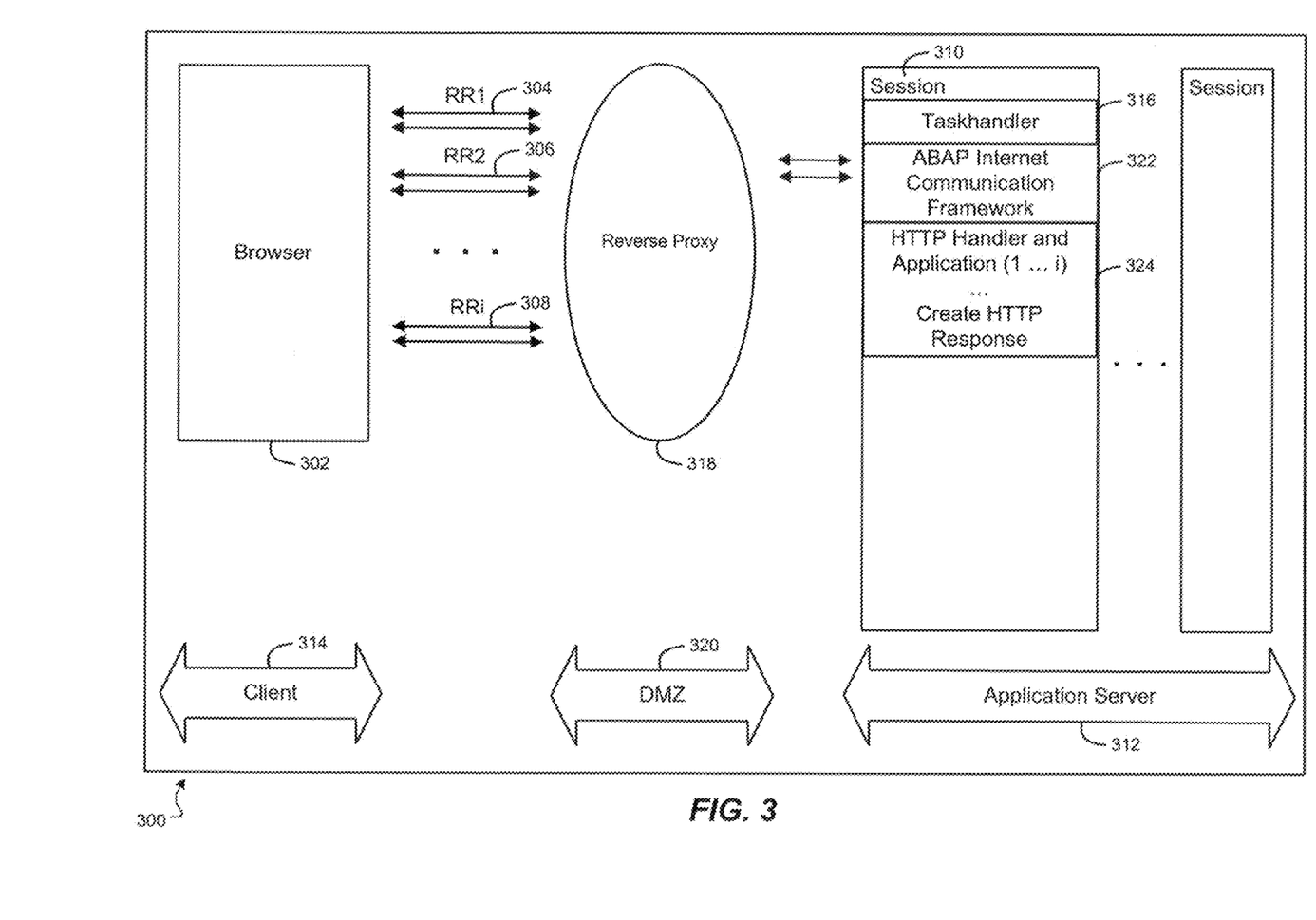
FIG. 3 is a functional block diagram of an exemplar communication between a client and an application server in accordance with the present disclosure.

FIG. 3 is a functional block diagram 300 of an exemplar communication between a client and an application server in accordance with the present disclosure. A client 314 can establish a session 310 with an application server 312. The client 314 can run browser 302, for example, which can use request and responses phases 304, 306, 308 to communicate with the application server 312. A first request 304, after a successful login, can result in the creation of a stateful session 310 with the application server 312. Subsequent request and response phases 306, 308 can represent interactions between the browser 302 on the client 314 and the application server 312 in the stateful session 310. In the example shown in FIG. 3, the stateful session 310 can be a HTTP session. A task handler ("taskhandler") 316 can manage the loading and unloading of user session context. In some implementations, a user can run a browser-based application (e.g., a Computer Aided Design (CAD) program) in the browser 302 on client 314. The CAD program can establish an HTTP session in an HTTP channel with the application server 312.

The stateful session 310 can include an Advanced Business Application Programming (ABAP) Internet Communication Framework (ICF) 322. The ABAP ICF 322 can provide an ABAP interface for HTTP requests. For example, ABAP programs can communicate with the internet using the ABAP ICF 322. The ABAP ICF 322 can receive and send web-based ABAP calls.

An HTTP handler and application 324 can receive HTTP requests. The HTTP handler and application 324 can receive the data sent in an HTTP request, execute handler-specific processing, and create a response to the HTTP request. By way of non-limiting example, an HTTP request handler and application 324 can provide the browser 302 with SAP reports. The HTTP request handler and application 324 can read selection criteria for the report, which can be sent with the request (e.g., in the Uniform Resource Locator (URL)). The HTTP request handler and application 324 can call the relevant report from the SAP system. The HTTP request handler and application 324 can convert the results to Hypertext Mark-up Language (HTML). The HTTP request handler and application 324 can return the reports to the requesting browser 302. To do this, the HTTP request handler and application 324 must be able to access the data and send a response back to the client 314. The ABAP ICF 322 can provide this infrastructure.

The browser request and response phases 304, 306, 308 are received by a reverse proxy 318 that can dispatch the inbound network traffic to one or more servers presenting a single interface to the user. In a system with a plurality of servers, a reverse proxy can be used for load balancing. The reverse proxy 318 can be included in DMZ 320, such as the exemplar DMZ of FIG. 2.

An example of the reverse proxy 318 is SAP WEB dispatcher provided by SAP AG. The SAP WEB dispatcher can be the entry point for HTTP requests into a system, which can include one or more application servers (e.g., application server 312). As a software web switch, the SAP WEB dispatcher can reject or accept connections. When the dispatcher accepts a connection, it can balance the load to ensure an even distribution across multiple servers.

In some implementations, the client 314 can establish more than one session with the application server 312. Each session can include the necessary handlers and applications to facilitate communication between the client 314 and the application server 312 dependent upon the connection protocol. In some implementations, the client 314 can establish more than one session where each session can be on the same application server or different application servers.

Figure 4:
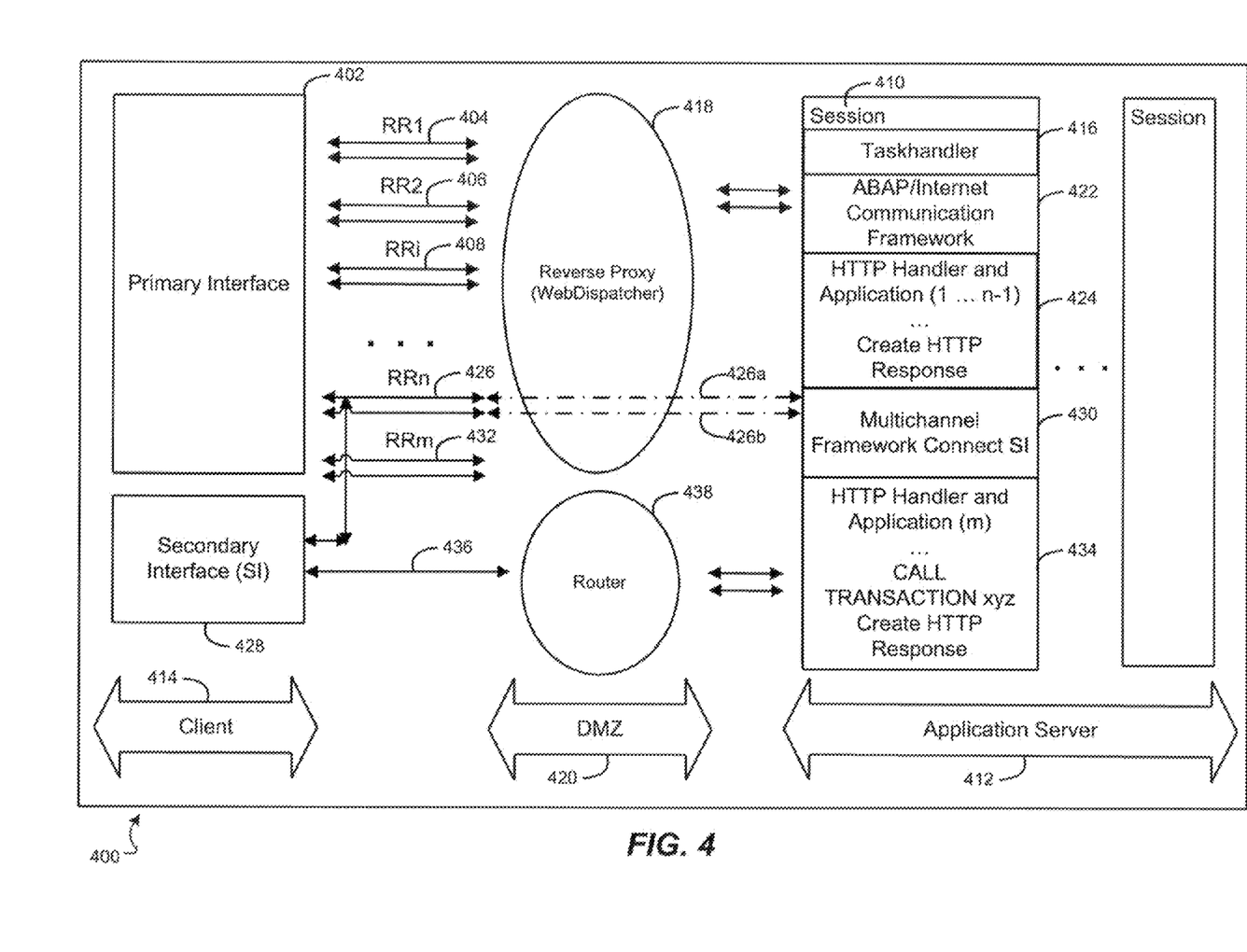
FIG. 4 is a functional block diagram of an exemplar communication between a client and an application server using multiple channels in accordance with the present disclosure.

Referring now to FIG. 4, a functional block diagram 400 of an exemplar communication between a client and an application server using multiple channels in accordance with the present disclosure is provided. A client 414 can run an application, such as a browser-based application (e.g., a Computer Aided Design (CAD) program), in a browser on a primary interface 402. The primary interface 402 can use request and responses phases (e.g., request and responses phases 404, 406, 408) to communicate with the application server 412. A first browser request 404, after a successful login, can result in the creation of a HTTP session 410 with the application server 412. Subsequent request and response phases 406, 408 can represent interactions between the primary interface 402 on the client 414 and the application server 412 in the HTTP session 410.

The HTTP session 410 can include a task handler ("taskhandler") 416, an ABAP ICF 422 and a HTTP handler and application 424. These session components can be identical to the task handler 316, the ABAP ICF 322, and the HTTP handler and application 324 session 310 components, respectively, in FIG. 3.

The primary interface request and response phases 404, 406, 408 are received by a reverse proxy 418 that performs in a similar manner as the reverse proxy 318 in FIG. 3. As in FIG. 3, an example of the reverse proxy 418 can include an SAP WEB dispatcher by SAP AG. The reverse proxy 418 can be included in DMZ 420, such as the exemplar DMZ of FIG. 2.

As described with reference to FIG. 4, the browser on the primary interface 402 can access the HTTP session 410 on the application server 412 by HTTP request and response phases 404, 406, 408 in order to interact with the browser-based application. In some implementations, certain browser interactions can require an alternate communication channel to access an application or data not available in the currently running browser-based application. The additional communication channel can share the same session information in order to enable consistent presentation of the data in both presentation layers connecting to the same session.

In the example of FIG. 4, the browser-based application (e.g., a CAD program) may require the use of a native SAPGUI connection to the existing HTTP session 410. This may be the case for a "power user interaction scenario" where a user may want to execute a transaction in the existing HTTP session 410 in order to enhance the HTTP session 410 with additional information. The user may need the SAPGUI connection, or other protocol connection, to perform certain browser-based application activities (e.g., execution of certain ABAP transactions in an expert mode of the browser-based application), which can change or enhance the user session information. SAPGUI, which is provided by SAP AG, is a platform used for remote access to an SAP central server in a company network.

Request and response phase 426 can initiate providing a secondary interface connection to the HTTP session 410. The client 414 can send the request 426a through the DMZ 420 or reverse proxy 418 to the HTTP session 410 on the application server 412 requesting the start of a secondary interface connection. A multi-channel framework connect secondary interface 430 in HTTP session 410 can be instantiated and invoked. The multi-channel framework connect secondary interface 430 can generate a SESSION_ID. The SESSION_ID can be generated on demand when a request for a secondary interface connection to the HTTP session 410 is received. The multi-channel framework connect secondary interface 430 can inform the task handler 416 about the request for the secondary interface connection, with the SESSION_ID as the connecting parameter to the present HTTP session 410.

In some implementations, the task handler 416 may determine that the application server 412 cannot perform a secondary interface connection in the HTTP session 410. For example, the task handler 416 may determine the user lacks the proper authorizations (e.g., the user lacks the authority to use the multi-channel framework connect secondary interface 430 to establish an alternative channel within the HTTP session 410). In this case, the task handler 416 can send an error message back to the client 414 for display to the user alerting them of the error. In some implementations, the task handler 416 may determine an error will occur in establishing a secondary interface connection. For example, the task handler 416 may determine the application server 412 does not have enough memory to support the SAP connection. In another example, the task handler 416 may determine that information for the process that delegates an HTTP request to the server cannot be transferred. In these cases, the task handler 416 may retry performing the secondary interface connection a predetermined number of times before sending an error message back to the client 414 for display to the user alerting them of the error.

If the task handler 416 determines that the application server 412 can perform a secondary interface connection in the HTTP session 410, the multi-channel framework connect secondary interface 430 can send a response 426b back through the DMZ 420 or reverse proxy 418 to the primary interface 402. The response 426b can include connection parameters (e.g., SESSION_ID, a reference to a secondary interface shortcut, the system identification, and/or the application server). A secondary interface connection is established and a secondary interface session starts in the secondary interface (SI) 428. In some implementations, when the task handler 416 determines that the application server 412 can perform a secondary interface connection in the HTTP session 410, the task handler 416 can make a call to the application server 412 to bind the secondary interface connection to the HTTP session 410. In some implementations, a new SESSION_ID can be generated for each additional communication channel and can be passed to both the task handler 416 and the SI 428 to establish a communication channel to the existing session 410.

The HTTP session 410 can continue to receive request and response phases (e.g., request and response phase 432) via the reverse proxy 418 from the primary interface 402. Once the secondary interface connection is established, a HTTP handler and application 434 can handle a request from the primary interface 402 that executes an ABAP transaction in the HTTP session 410. The HTTP response returns after the CALL TRANSACTION in the HTTP handler and application 434 terminates. A response 436 can be sent to the SI 428. The response 436 can include information for screen output on the SI 428 in the established secondary interface session.

In some implementations, the HTTP session 410 can send the response 436 to the SI 428 via router 438. In some implementations, a secondary interface can use remote function call (RFC) communication. The HTTP handler and application 434 can create an HTTP response that includes the data generated from the execution of an ABAP transaction in the HTTP session 410. The router 438 can serve as an intermediate station (proxy) in a network connection acting as a reverse proxy for RFC communication. Referring to FIG. 2, the router 438 can provide a level of security in order to restrict or protect the access out of the internal network 204 (a secure zone) to the Internet 202 (an unsecure zone). Additionally, the router 438 can set up an indirect connection between the HTTP session 410 and the SI 428 when a secondary interface connection is established to accommodate for the use of RFC or SAPGUI communication for the secondary interface. In some implementations, a router 438 may not be required.

For example, when an interaction with the primary interface 402 results in an interaction with or output to the SI 428

(e.g. CALL TRANSACTION in the HTTP handler and application 434), the interaction can be forwarded to the SI 428 until the interaction with the SI 428 is terminated. In some implementations, an RFC program can act as a secondary interface. In this implementation, RFC calls to the client program of the RFC program can be forwarded to the communications channel associated with the secondary interface. Therefore, the router 438 can be used for RFC and SAPGUI communication.

In some implementations, the client 414 can establish more than one session with the application server 412. Each session can include the necessary handlers and applications to facilitate communication between the client 414 and the application server 412 dependent upon the connection protocol. In some implementations, the client 414 can establish more than one session where each session can be on the same application server or different application servers. Each session can include multiple channels where each multi-channel session can share the session with different channels. When a user is finished using the channel, they can disconnect the channel. At any time during the duration of the session, a user can connect and disconnect multiple channels to the same session.

In some implementations, a task handler call can be made to a dedicated application server (e.g., application server 412) as opposed to a system of servers to perform a secondary interface connection in the dedicated server. In some implementations, a task handler call can be propagated to all servers in a system to establish a secondary interface connection independent of the particular server.

In some implementations, in order to initiate a secondary interface connection via an HTTP response (e.g., request and response phase 426), the HTTP response can include an appropriate content-type (e.g., "application/x-sapshortcut"). This response can instruct the desktop on the client (e.g., client 414) to start the execution of a secondary interface program with the received arguments. For example, the assignment of a dedicated extension (e.g., ".sap") to an SAPGUI application (e.g., SAPGUI.exe) running on the client (e.g., client 414) can instruct a front end (e.g., client 414) to start a program (e.g., SI 428) with the given-parameters.

In some implementations, in order to establish a secure secondary interface connection, the secondary interface shortcut can be used for configuration of the security settings of the communication channel. A client (e.g., client 414) can create a secondary interface shortcut under a certain identifier where the secondary interface shortcut can maintain the security settings in the connection settings of the shortcut. In some implementations, in order to avoid an intruder connecting to an existing stateful session (e.g., an HTTP session), additional logon information from the user may be required. The provided login data can be matched with the identity of session user (e.g., the client, the username and password in the case where the user logged on with a username and password). In some implementations, in order to avoid an intruder connecting to an existing stateful session (e.g., an HTTP session), a user may provide a X509 certificate or a security session tickets (SSO ticket) where the mapping reflects the same user account as the running session.

In some implementations, the use of a SAPGUI connection along with a browser-based application can enable a user to execute ABAP transactions that they are authorized to execute. By way of a non-limiting example, a user initiates a browser-based CAD program on the client 414 to construct a car, for example. The browser-based CAD program (specifically the browser-based GUI) may not be able to handle the additional functionality a SAPGUI based ABAP transaction can provide. Having a SAPGUI connection in the HTTP session can allow a user the ability to perform certain activities that can enhance the HTTP session information. For example, a SAPGUI ABAP transaction can extend the database entries of the CAD program to include certain materials by adding other entities (e.g., the addition of tire types, the addition of engine types, the addition of spoiler types, etc.). A SAPGUI ABAP data warehouse transaction can check the availability in inventory of particular materials needed for the construction of the car (e.g., tires, windshields, steering wheels, etc.). A SAPGUI ABAP transaction can check a current planning budget allowing the user the ability to determine the budget for the construction of the car. A SAPGUI ABAP transaction can order alternative material for the development. A SAPGUI ABAP transaction can allow a user the ability to send a request or message that includes the constructed car to a colleague or boss requesting review and further assistance.

In some implementations, a user may want to share information in one type of session using different communication channels to create a multi-channel session. FIG. 4 illustrates the use of a secondary interface connection in an existing HTTP session. Additional sessions and connections can include HTTP, RFC, SAPGUI, File Transfer Protocol (FTP) and Simple Mail Transfer Protocol (SMTP). In some implementations, a user may want to share information in an RFC session with a SAPGUI connection and with a HTTP connection. In some implementations, a user may want to share information in a HTTP session with a SAPGUI connection and with a RFC connection. In some implementations, a user may want to share information in a SAPGUI session with a HTTP connection and a RFC connection. In some implementations, other sessions and connections can be combined to create multi-channel sessions. A new SESSION_ID can be generated for each additional communication channel and can be passed to both the task handler 416 and the SI 428 to establish a communication channel to the existing session 410.

For example, in order to extend an existing session and enable a request for a communication channel to be forwarded to the existing session, a session identifier (e.g., a SESSION_ID connection parameter) can inform a task handler, an Internet Connection Manager monitor (ICman), or a SAP Gateway to connect a request of the type RFC, HTTP, SAPGUI, SMTP or FTP to the existing session. For example, in order to enable a request for a SMTP communication channel to be added to an existing non-SMTP session, a session identifier can be included as part of the SMTP header. For example, in order to enable the addition of a RFC communication channel to an existing non-RFC session, the application server may need to know the name of the RFC client application (e.g., rfcclient) to launch at the client. The client can configure or pass this information through additional client/server user interaction. For example, in order to enable a request for a FTP communication channel to be added to an existing non-FTP session, a session identifier can be included as part of the FTP logon data (e.g., username).

Figure 5:
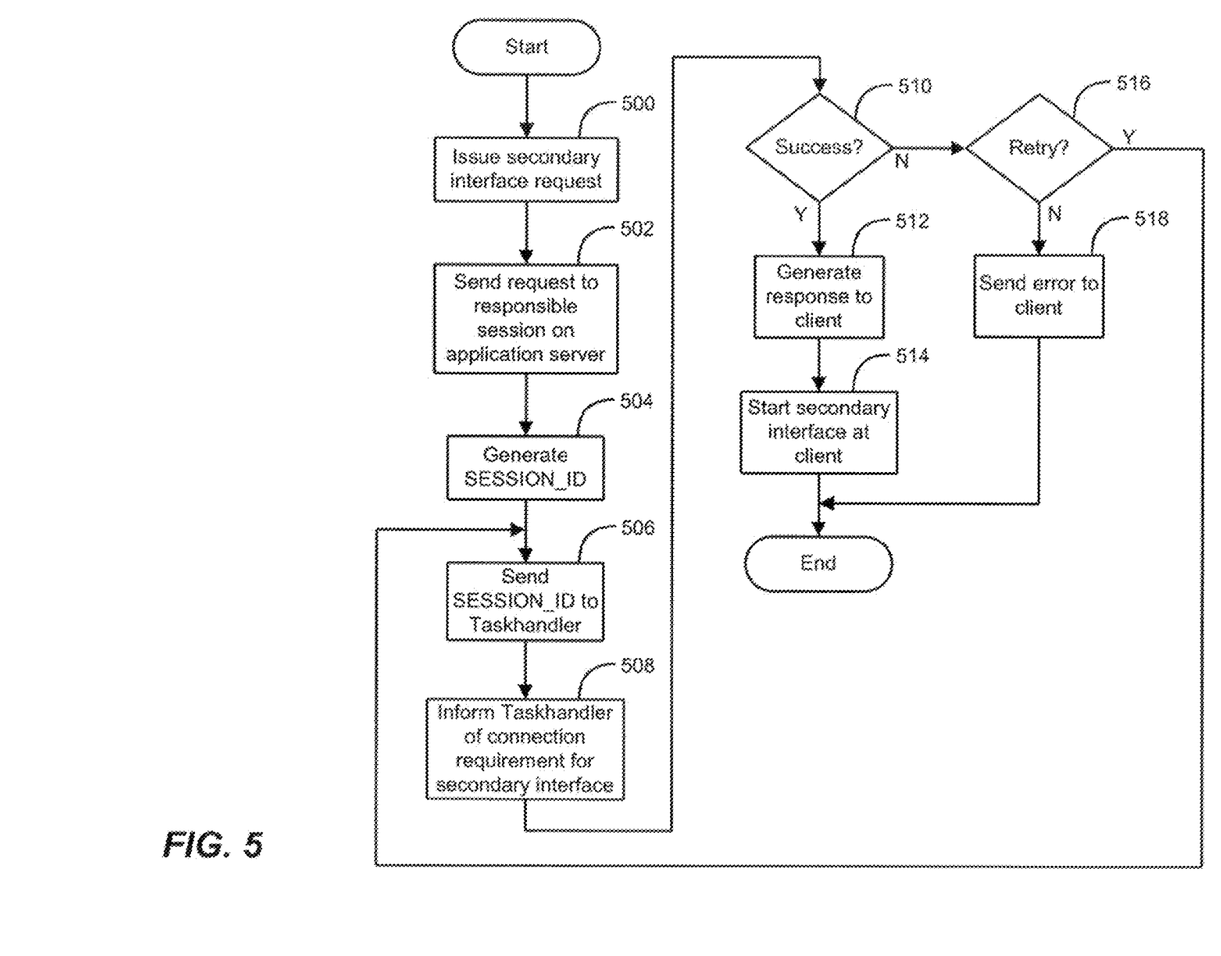
FIG. 5 is a flowchart illustrating exemplar steps that can be executed to provide multiple channels for a single session in accordance with the present disclosure.

FIG. 5 is a flowchart illustrating exemplar steps that can be executed to provide multiple channels for a single session in accordance with the present disclosure. For example, the exemplar steps of FIG. 5 may be implemented using software instructions stored in a computer-readable storage medium and executed by a processing system including one or more processing apparatus, or processors.

The description of the flowchart of FIG. 5 includes references to components included in FIG. 4. Additionally, FIG. 4 can represent an interaction scenario that can be implemented by the system of FIG. 1 (e.g., the client 414 can be, for example, client 108 and the application server 412 can be, for example, the application server 102). The exemplar steps illustrated in FIG. 5 can be included in the interaction scenario of FIG. 4.

In step 500, a secondary interface request is issued. For example, the request and response phase 426 can initiate providing a secondary interface connection to the HTTP session 410. In step 502, a request is sent to the responsible session on the application server. For example, the client 414 can send the request 426a through the DMZ 420 or reverse proxy 418 to the HTTP session 410 on the application server 412 requesting the start of a secondary interface connection. In step 504, a SESSION_ID is generated. For example, a multi-channel framework connect SI 430 in HTTP session 410 can be instantiated and invoked. The multi-channel framework connect SI 430 can generate a SESSION_ID. In step 506, the SESSION_ID is sent to the task handler. In step 508, the multi-channel framework connect SI 430 informs the task handler of the connection requirement for the secondary interface. For example, the multi-channel framework connect SI 430 can inform the task handler 416 about the request for the secondary interface connection, with the SESSION_ID as the connecting parameter, to the present HTTP session 410.

In step 510, it is determined whether the secondary interface connection is successful. If the connection is successful, a response is generated and transmitted to the client in step 512. For example, the multichannel framework connect SI 430 can send a response 426b back through the DMZ 420 or reverse proxy 418 to the SI 428. The response 426b can include connection parameters (e.g., SESSION_ID, a reference to a SAPGUI shortcut, the system identification, and the application server). In step 514, the secondary interface at the client is started. For example, a secondary interface connection is established and a secondary interface session starts in the SI 428.

If, in step 510, the connection is unsuccessful, it is determined whether the connection should be retried in step 516. If the connection should be retried, the steps loop back to step 506. For example, if the task handler 416 determines that information for the process that delegates an HTTP request to the server cannot be transferred, retry performing the secondary interface connection a predetermined number of times before sending an error message back to the client 414. If the connection cannot be retried, an error message is sent to the client in step 518. For example, if the task handler 416 determines the user lacks the proper authorizations, an error message is sent to the client 414 for display to the user alerting the user of the error.

Figure 6:
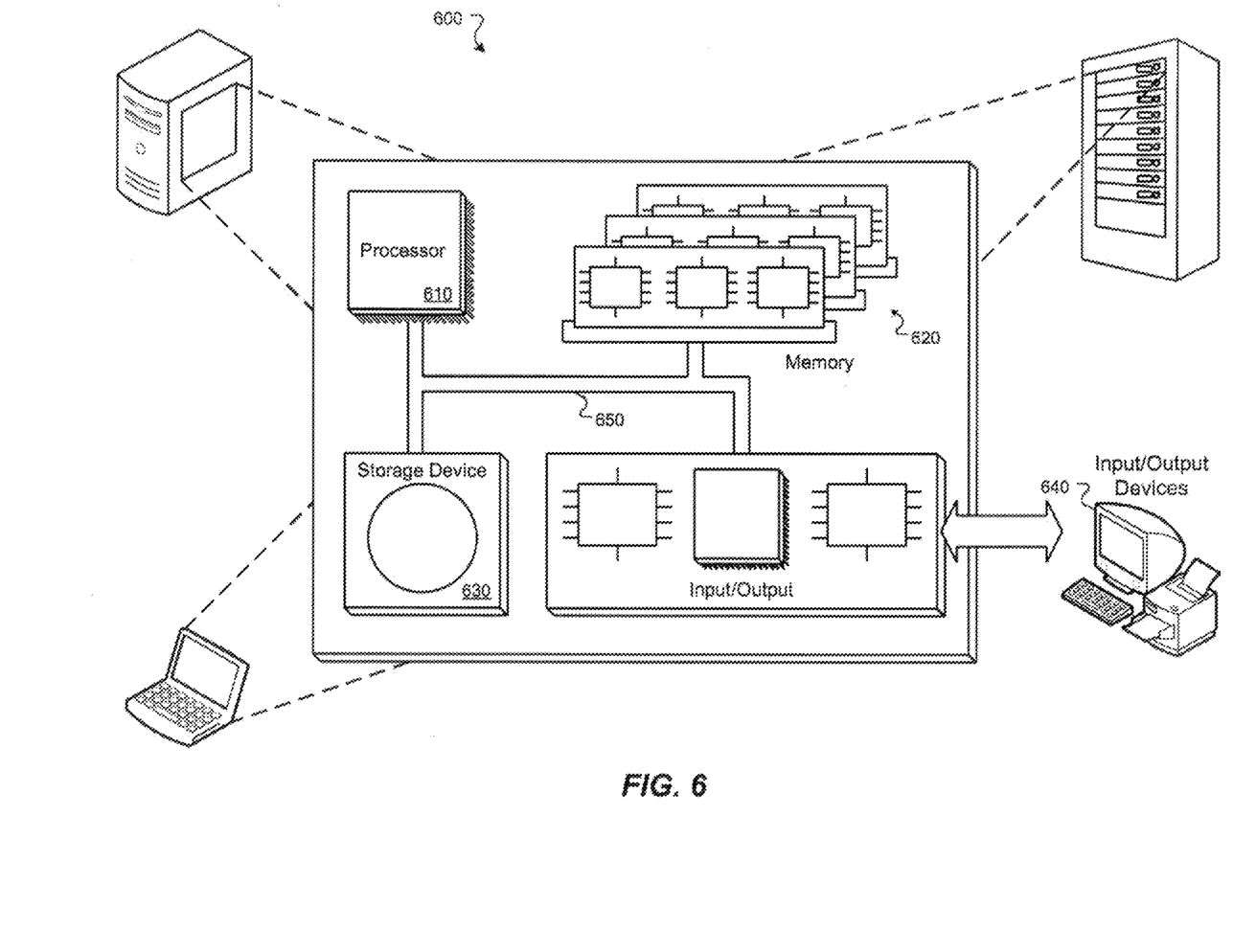
FIG. 6 is a schematic illustration of exemplar computer systems that can be used to execute implementations of the present disclosure.

Referring now to FIG. 6, a schematic diagram of an exemplar computer system 600 is provided. The system 600 can be used for the operations described in association with the methods described in FIGS. 3-5 according to one implementation. For example, the system 600 may be included in any or all of the servers 102. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method of providing multiple communication channels between a client and a session, comprising:
    instantiating the session on an application server;
    establishing a first communication channel between the session and a primary interface provided on the client, the primary interface using a first communication protocol to communicate with the session;
    transmitting a connection request from the primary interface to the session using the first communication channel;
    receiving, at the primary interface, a connection response comprising connection parameters that include a session identifier that identifies the session;
    in response to receiving the connection response:
        instantiating a secondary interface on the client; and
        establishing a second communication channel between the secondary interface and the session based on the session identifier, the secondary interface using a second communication protocol different from the first communication protocol to communicate with the session;
    transmitting a user request from the primary interface through the first communication channel to the session, the session processing the user request to generate a response; and
    receiving the response at the secondary interface, the response having been transmitted through the second communication channel.

2. The method of claim 1, further comprising authorizing a user for communication through the second communication channel based on a security protocol.

3. The method of claim 1, further comprising authorizing a client for communication with the session through the second communication channel based on at least one of a certificate and a session ticket provided to the session from the client.

4. The method of claim 1, wherein each of the first and second communication protocol includes one of hypertext transfer protocol (HTTP), SAPGUI protocol, remote function call (RFC) protocol, simple mail transfer protocol (SMTP) and file transfer protocol (FTP).

5. A non-transitory, computer-readable storage medium coupled to one or more processors and having instructions stored thereon which, when executed by the one or more processors, cause the one or more processors to perform operations comprising:
    instantiating a session on an application server;
    establishing a first communication channel between the session and a primary interface provided on a client, the primary interface using a first communication protocol to communicate with the session;
    transmitting a connection request from the primary interface to the session using the first communication channel;
    receiving, at the primary interface, a connection response comprising connection parameters that include a session identifier that identifies the session;
    in response to receiving the connection response:
        instantiating a secondary interface on the client; and
        establishing a second communication channel between the secondary interface and the session based on the session identifier, the secondary interface using a second communication protocol different from the first communication protocol to communicate with the session;
    transmitting a user request from the primary interface through the first communication channel to the session, the session processing the user request to generate a response; and
    receiving the response at the secondary interface, the response having been transmitted through the second communication channel.

6. The storage medium of claim 5, wherein the operations further comprise authorizing a user for communication through the second communication channel based on a security protocol.

7. The storage medium of claim 5, wherein the operations further comprise authorizing a client for communication with the session through the second communication channel based on at least one of a certificate and a session ticket provided to the session from the client.

8. The storage medium of claim 5, wherein each of the first and second communication protocol includes one of hypertext transfer protocol (HTTP), SAPGUI protocol, remote function call (RFC) protocol, simple mail transfer protocol (SMTP) and file transfer protocol (FTP).

9. A system of providing multiple communication channels between a client and a session, comprising:
    an application server that hosts the session;
    one or more processors; and
    a non-transitory computer-readable storage medium coupled to the one or more processors having instructions stored thereon which, when executed by the one or more processors, cause the one or more processors to perform operations comprising:
    instantiating a session on an application server;
    establishing a first communication channel between the session and a primary interface on the client, the primary interface using a first communication protocol to communicate with the session;
    transmitting a connection request from the primary interface to the session using the first communication channel;

receiving, at the primary interface, a connection response comprising connection parameters that include a session identifier that identifies the session;

in response to receiving the connection response:

instantiating a secondary interface on the client; and establishing a second communication channel between the secondary interface and the session based on the session identifier, the secondary interface using a second communication protocol different from the first communication protocol to communicate with the session;

transmitting a user request from the primary interface through the first communication channel to the session, the session processing the user request to generate a response; and receiving the response at the secondary interface, the response having been transmitted through the second communication channel.

10. The system of claim 9, wherein the operations further comprise one of authorizing a user for communication through the second communication channel based on a security protocol, and authorizing a client for communication with the session through the second communication channel based on at least one of a certificate and a session ticket provided to the session from the client.

11. The system of claim 9, wherein each of the first and second communication protocol includes one of hypertext transfer protocol (HTTP), SAPGUI protocol, remote function call (RFC) protocol, simple mail transfer protocol (SMTP) and file transfer protocol (FTP).

* * * * *